United States Patent Office 3,350,917
Patented Nov. 7, 1967

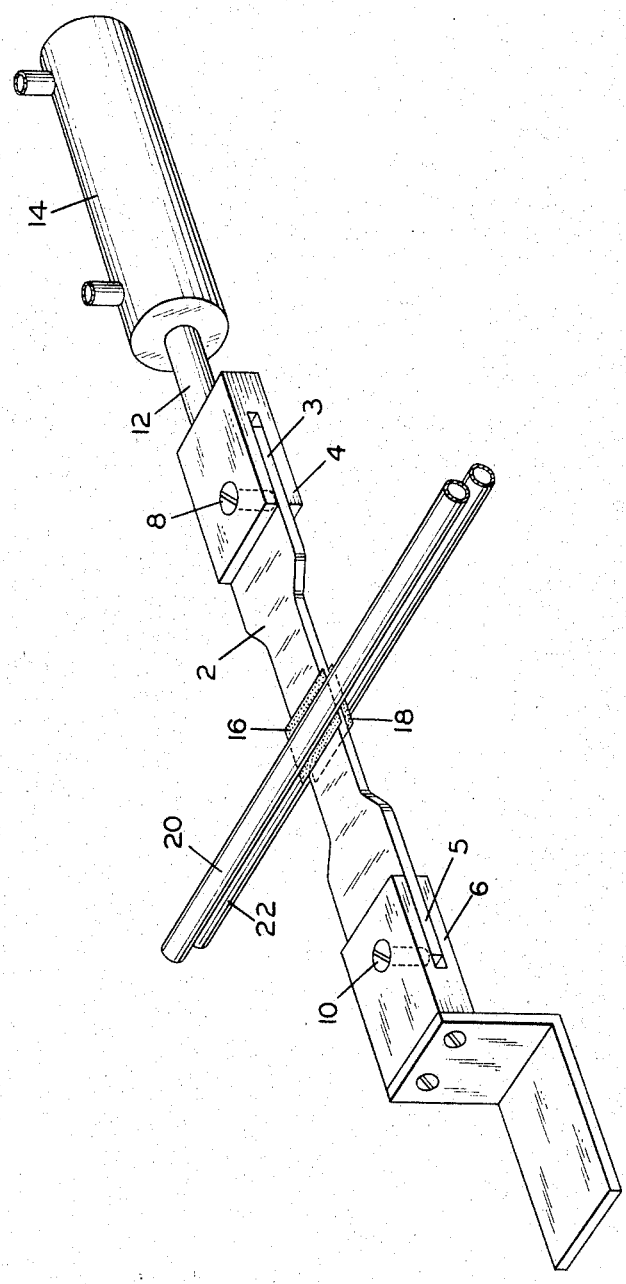

3,350,917
ENVIRONMENTAL STRESS RUPTURE
APPARATUS
Robert C. Wincklhofer, Whippany, and Mahendra Bhuta, Mendham, N.J., assignors to Allied Chemical Corporation, New York, N.Y., a corporation of New York
Filed Nov. 12, 1964, Ser. No. 410,607
3 Claims. (Cl. 73—15.6)

ABSTRACT OF THE DISCLOSURE

An environmental stress rupture apparatus comprising means for maintaining a constant stress on the test sample, means for heating the sample consisting of heat conducting tubes on both sides of the sample through which a heat transfer medium circulates and means for subjecting the sample to the desired stress environment consisting of absorbent material containing the stress environment placed between the heating tubes and in contact therewith and with both sides of the test sample.

---

This invention relates to the environmental stress rupture apparatus. More particularly this invention relates to an environmental stress rupture apparatus in which environmental stress rupture can be determined readily in a neat and convenient manner without the aid of extensive equipment and the like.

Environmental stress cracking or stress rupture can be defined as "failure in a surface-initiated brittle fracture of a specimen such as polyethylene plastic or part thereof under stress in contact with a medium in the absence of which fracture does not occur under the conditions of stress. Combinations of external and/or internal stress may be involved, and the sensitizing medium may be gas, liquid, semi-solid or solid."

The environmental stress rupture test measures the effective life of a plastic or other material as a function of stress and temperature within an environment such as a surface active agent which will accelerate stress cracking or rupture of the specimen. The test determines the time of mechanical failure of a material under various conditions of stress, temperature and surface active agent and has proven useful in determining what plastics can be used as containers such as blown bottles, or other uses, such as wire insulation. The test affords a basis of comparison between different materials under similar conditions of various stress situations to determine the best selection of materials according to the desired application.

The presently accepted ASTM method (D-1693) for the determination of environmental stress cracking of plastics consists of placing samples under certain conditions of stress in an environment in which the plastic may exhibit mechanical failure by cracking. The samples are bent around a holder, a controlled imperfection is cut into the exposed surface and the holder is emersed in the environment, i.e., a surface active agent which is maintained at a temperature of 50° C. The samples are frequently inspected for signs of cracking and the sample failure time is noted. This method has the disadvantage that the sample is subjected to constant strain, in addition to stress, by being bent. This means that a stress relaxation due to orientation of the molecule within the sample may occur and sample failure time then becomes a function of the rate of stress relaxation as well as environmental stress cracking. Still another disadvantage is that the stress applied cannot be regulated; it is a function of the stiffness of the resin and is an independent variable. Furthermore the test is quite subjective and hence different operators can obtain markedly different and varied results.

It has been proposed to perform the environmental stress rupture test by applying a constant stress to the samples to be tested by subjecting them to a constant tensile load, the environment and temperature being supplied by the emersion of the equipment in a constant temperature bath containing the stress environment such as a surface active agent. When the samples fail, a level arm provided in the apparatus providing the constant tensile load falls and shuts off an elapse timer. This test, while it avoids the interference of stress relaxation and results in a final rupture of the sample, is subject to the criticism that the sample may rupture at a point near its tab end where a hole has been provided in the sample to maintain the sample in a jaw which is movable by the apparatus supplying the constant load. Obviously this is due to the failure of the apparatus to concentrate the environmental stress rupture environment at one portion of the sample being tested whereby to limit rupture to that point and insure that rupture is being caused by the combination of temperature stress and environment and not due to a hole or slit provided in the sample for gripping the same to a movable jaw. Furthermore, the apparatus can use as the heating medium only an environment which causes or helps to induce rupture of the sample and hence use of the apparatus is limited thereby. Still another disadvantage of this apparatus is that the tests when using the same cannot be performed in a clean and convenient manner as at least part of the apparatus supplying the tensile load must be emersed in the environment.

It is an object of this invention to provide an environmental stress rupture apparatus which can be used to perform environmental stress rupture tests in a clean and convenient manner.

It is still another object of this invention to provide such an environmental stress rupture apparatus which concentrates the environment, e.g., surface active agent on only a portion of the sample being tested and which maintains the condition of temperature only at this point to insure that rupture of the sample is due only to stress, environment and temperature and not to any previous imperfections, holes or slits placed in the sample.

These and other objects and advantages of our apparatus will become apparent from the following description and appended claims.

According to our invention, an improved environmental stress rupture apparatus for continuing means for maintaining a constant stress upon the sample being tested is provided, the improvement comprising at least 2 tubes constructed of a heat conductive material, at least one of said tubes located on one side of the sample being tested and at least another of said tubes being located on the opposite side of said sample; between said tubes and in contact therewith and with the respective sides of the sample an absorbent material containing the stress environment.

Referring to the accompanying drawing which is a perspective veiw of our environmental stress rupture apparatus, reference 2 shows the sample being tested maintained within clevises 4 and 6 at their respective tab end 3 and 5. Each tab end 3 and 5 has a hole (not shown) cut through it at least ½″ from either end of the sample 2. Clevis pins 8 and 10 pass through the respective clevises and thence through the hole provided at the respective tab end of the sample. Clevis 6 is stationary while clevis 4 is movable by a constant force supplied by air cylinder 14 which constant force draws piston rod 12 into air cylinder 14 thereby maintaining a constant tensile load or stress upon sample 2. The air cylinder 14 is adjusted to insure constant pressure. This is done by means of the application of a regulated pressure. Constant pressure air is passed into the cylinder and atmospheric pressure is maintained at the rear of the cylinder. The stress provided by air cylinder 14 is normally such that it is insufficient to rupture sample 2 when sample 2 is not subjected to an environment or increased temperature. On either side of sample 2 and preferably at the middle thereof there are provided absorbent material 16 and 18 saturated with the stress environment, e.g., a surface active agent. On the outside of absorbent material 16 and 18 but in contact therewith there are provided tubes 20 and 22 constructed of the heat conductive material through which passes a heating oil or the like at a rapid rate.

In operation the sample is connected to the clevises by first providing a hole on tab end 3 and 5 at least ½" from either end of the sample and clevis pins 8 and 10 pass through the top clevises 4 and 6 and thence through the holes on the tab end into the bottom portion of the clevises. Clevis 4 has attached thereto piston rod 12 movable by air cylinder 14, or other means, which exerts a constant stress load upon the sample 2. Absorbent material 16 and 18 which are capable of being saturated with the environment, e.g., a surface active agent, are placed on top and beneath sample 2 as indicated in the accompanying figure. Tubes 20 and 22 are connected to a constant temperature bath (not shown) containing a heating fluid via a gear pump (not shown) and placed in contact with and over absorbent material 16 and 18. With the needle valve (not shown) of air cylinder 14, the pressure regulator (not shown) is adjusted. The constant temperature bath (not shown) containing the heating oil, e.g., silicone oil, is heated until the desired test temperature is provided. The absorbent materials are then saturated with environment. The gear pump (not shown) used to circulate the heating oil is turned on and the heating oil is circulated through the tubes 20 and 22 until the desired constant test temperature is insured on the sample. It usually takes about 5 minutes to allow the sample to come to test temperature. When the sample has come to temperature, the needle valve on the air cylinder is opened at which time an automatic timer (not shown) connected thereto is started. The needle valve is opened sufficiently to provide the desired force taking into account the desired stress level of the sample together with its cross-sectional area. When the sample ruptures the piston arm 12 will be thrust inward into the air cylinder 14 thus shutting off a timer connected thereto and actuatable by the piston rod 12.

The environmental stress rupture tests are normally performed on about 10 samples each sample covering a thickness range no greater than ±5% of a nominal value. When all of the samples have ruptured the pump used to pump the heating oil through the tubes 20 and 22 is shut off. The time of rupture of each sample is arranged in chronological order and a plotting number for each sample is assigned to its according to the following equation:

$$\frac{N_1}{N+1} \times 100 = \text{Plotting number}$$

where $N_1$ is the order or test number and $N$ is the total number of tests. Thus where there are 10 tests, the plotting number of the sample to rupture first is $$\frac{1}{10+1} \times 100 \text{ or } 9.1$$

The plotting number is then plotted on log-normal probability paper against the failure or rupture time in hours of such sample. The best straight line is drawn through the points on the probability paper and the environmental stress rupture is shown as the time at Plotting No. 50.

In our apparatus instead of using an air cylinder 14 one can use any other device which will constantly exert a tensile load or stress upon the sample 2. Instead of a heating oil such as silicone oil one can use any other material and if it is desired to test the environmental stress rupture at temperatures, say at below room temperature, one can use a cooling fluid or gas such as anhydrous ammonia. In our apparatus the tubes 20 and 22 as indicated above are constructed of heat conductive materials since they keep the sample and the environment saturated with the surface active agent or other environment for inducing rupture of the sample at the test temperature. The tubes are preferably constructed of copper because of its excellent heat conductivity and can be elliptical so as to cover a greater surface area on either side of the absorbent material. It is also to be realized in our apparatus that we need not use the clevises depicted in our drawing together with the clevis pins as we can use any grip which will grip the sample at the tab ends under the conditions of testing. The absorbent material containing the environment for the test is not particularly critical and any cellulosic type material such as felt which will absorb the test environment is suitably employed in our apparatus.

From the foregoing, it is readily seen that we have provided an environmental stress rupture apparatus which can be utilized to perform environmental stress rupture tests in a clean and convenient manner and which can be operated at varied conditions of temperature and environment and which does not comprise extensive or highly intricate parts or the like. Our apparatus assures that the rupture in the sample occurs at the point where the environment, e.g., surface active agent is provided, and not at holes in the sample provided for clevis pins to pass through to hold the sample to clevises or the like.

Although certain embodiments of our invention have been specifically set forth above, these have been set forth for purposes of illustrating our invention and should not be considered as limiting the same since certain modifications and departures from the above disclosure will become apparent to one skilled in the art. Accordingly our invention should be construed only in the light of its spirit and scope using the appended claims as a guide thereto.

We claim:
1. In an environmental stress apparatus provided with means for maintaining a constant stress upon the sample being tested, the improvement of at least 2 tubes constructed of heat conductive material at least one of said tubes located on one side of the sample being tested and at least another of said tubes being located on the opposite side of the sample; means for circulating a heat exchange medium through said tubes; between said tubes and in contact therewith and with the respective sides of the sample an absorbent material containing the stress environment.

2. An environmental stress apparatus according to claim 1 wherein said tubes are copper and environmental stress apparatus environment is a surface active agent.

3. An environmental stress apparatus according to claim 1 wherein said means for maintaining a constant stress upon the sample is an air cylinder connected to a movable clevis by a piston rod and operable to draw said clevis via a piston rod whereby to exert stress upon the sample.

References Cited

UNITED STATES PATENTS

| | | | |
|---|---|---|---|
| 1,911,556 | 5/1933 | De Staebler | 73—97 |
| 2,600,453 | 6/1952 | Weingart | 73—15.6 |
| 2,685,195 | 8/1954 | Streblow | 73—15.6 |
| 3,196,670 | 7/1965 | Lander | 73—15.6 |
| 3,198,715 | 8/1965 | Fowler et al. | 204—1 |

JAMES J. GILL, *Primary Examiner.*

RICHARD C. QUEISSER, *Examiner.*

J. H. WILLIAMSON, *Assistant Examiner.*